(12) United States Patent
Holveck

(10) Patent No.: US 8,348,580 B2
(45) Date of Patent: Jan. 8, 2013

(54) DIRECTIONAL FASTENER

(76) Inventor: Joseph E. Holveck, Gardiner, NY (US)

( * ) Notice: Subject to any disclaimer, the term of this patent is extended or adjusted under 35 U.S.C. 154(b) by 571 days.

(21) Appl. No.: 12/460,783

(22) Filed: Jul. 24, 2009

(65) Prior Publication Data

US 2010/0021266 A1 Jan. 28, 2010

Related U.S. Application Data

(60) Provisional application No. 61/137,184, filed on Jul. 28, 2008.

(51) Int. Cl.
*F16B 15/00* (2006.01)

(52) U.S. Cl. .................. 411/487; 411/451.1; 411/451.4

(58) Field of Classification Search ............... 411/387.8, 411/411, 419, 420, 424, 439, 451.1, 451.4, 411/486, 487, 491, 492–493
See application file for complete search history.

(56) References Cited

U.S. PATENT DOCUMENTS

| 82,900 | A | * | 10/1868 | Walton | 411/469 |
|---|---|---|---|---|---|
| 261,213 | A | * | 7/1882 | Estabrook | 411/493 |
| 371,162 | A | * | 10/1887 | Algeo | 470/195 |
| 485,939 | A | * | 11/1892 | Ilanor | 29/283 |
| 1,095,052 | A | * | 4/1914 | Wechsler et al. | 411/493 |
| 2,403,222 | A | * | 7/1946 | Howells | 227/134 |
| 2,430,294 | A | * | 11/1947 | Howells | 411/456 |
| 2,793,559 | A | * | 5/1957 | Yedinak | 411/456 |
| 3,945,414 | A | * | 3/1976 | Gordon | 81/488 |
| 4,907,928 | A | * | 3/1990 | Beck et al. | 411/356 |
| 5,658,109 | A | | 8/1997 | Van Allman et al. | |
| 5,672,178 | A | * | 9/1997 | Petersen | 606/75 |
| 7,040,851 | B2 | | 5/2006 | Esser et al. | |
| 7,118,315 | B2 | | 10/2006 | Huang | |
| 7,845,889 | B2 | * | 12/2010 | Shelton et al. | 411/451.4 |
| 2003/0161703 | A1 | * | 8/2003 | Weiss | 411/487 |
| 2004/0136811 | A1 | * | 7/2004 | Tarlton | 411/451.4 |

* cited by examiner

*Primary Examiner* — Roberta Delisle
(74) *Attorney, Agent, or Firm* — Oktay Enterprise Int'l., LLC; Sevgin Oktay

(57) ABSTRACT

A fastener capable of changing form and direction in order to conform to a desired fastening trajectory while being propelled by a manual or power-actuated tool into one or more elements out of line of sight to be fastened together.

13 Claims, 8 Drawing Sheets

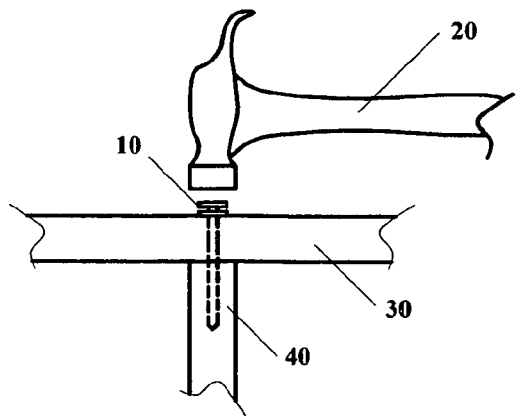
*FIG. 1 - Prior Art*
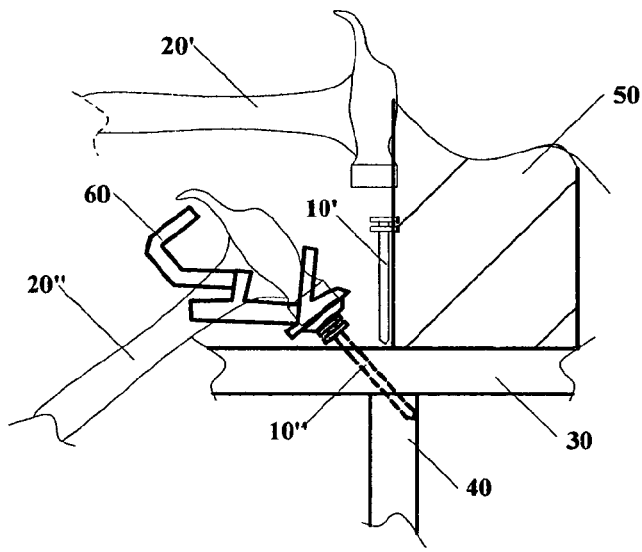
*FIG. 2 - Prior Art*
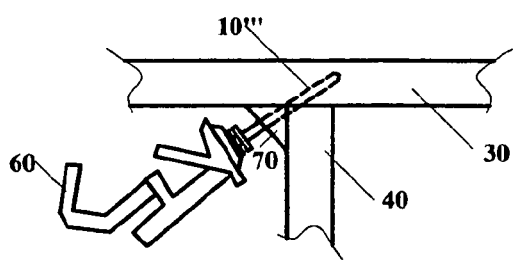
*FIG. 3 - Prior Art*

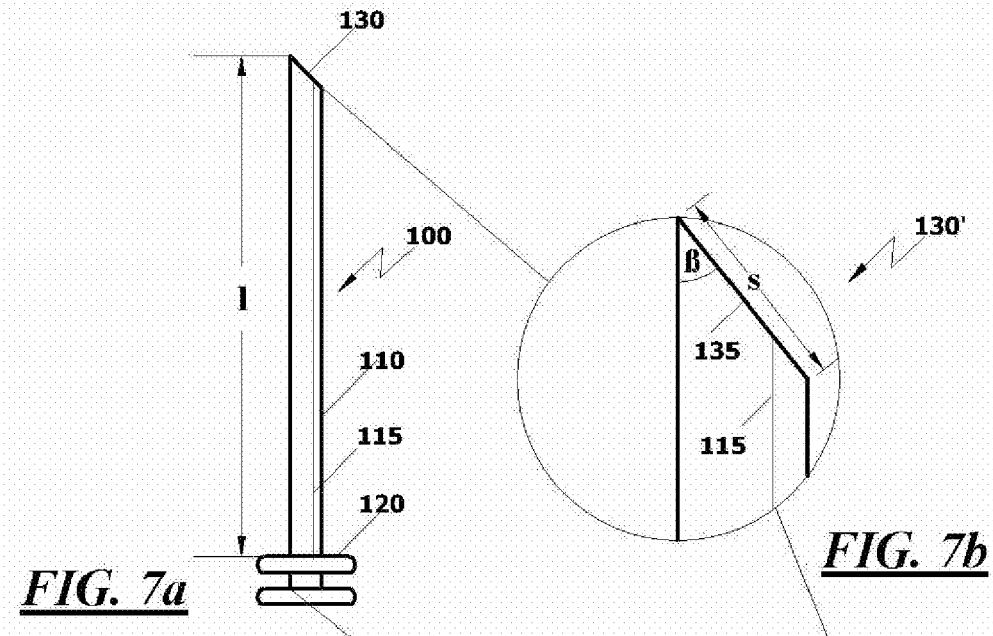
FIG. 7a
FIG. 7b
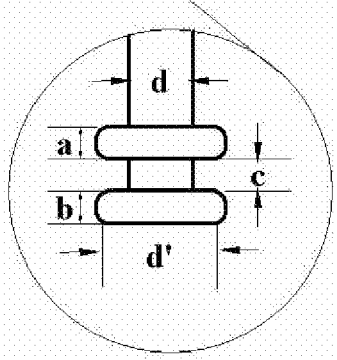
FIG. 7d
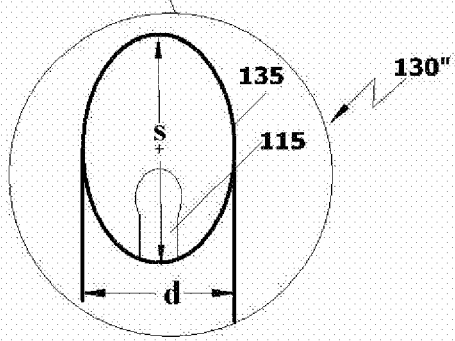
FIG. 7c

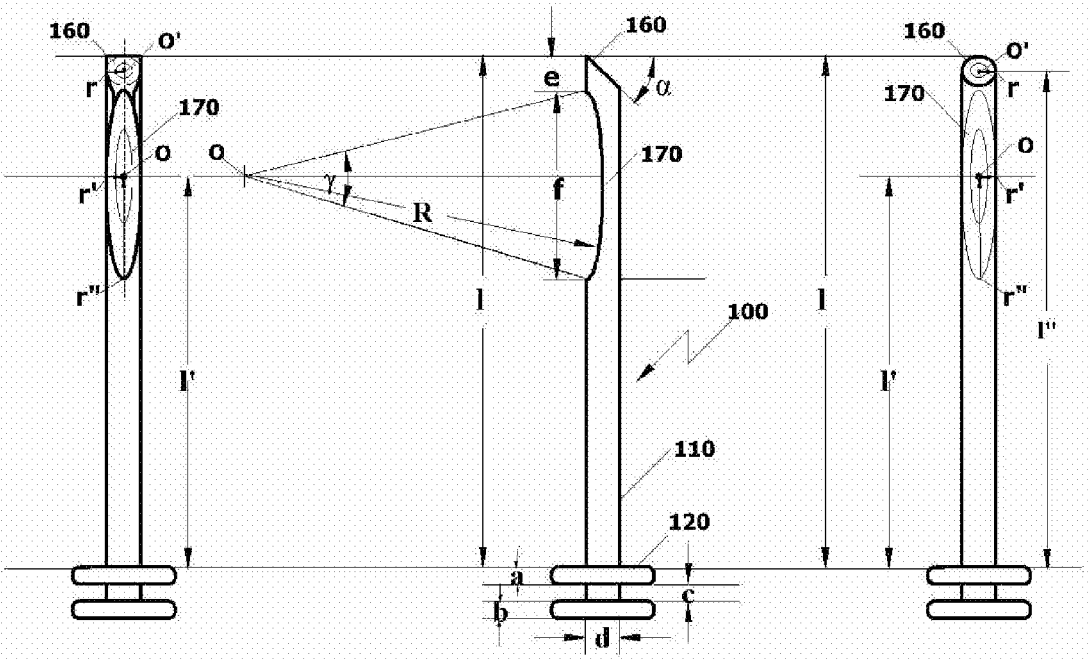
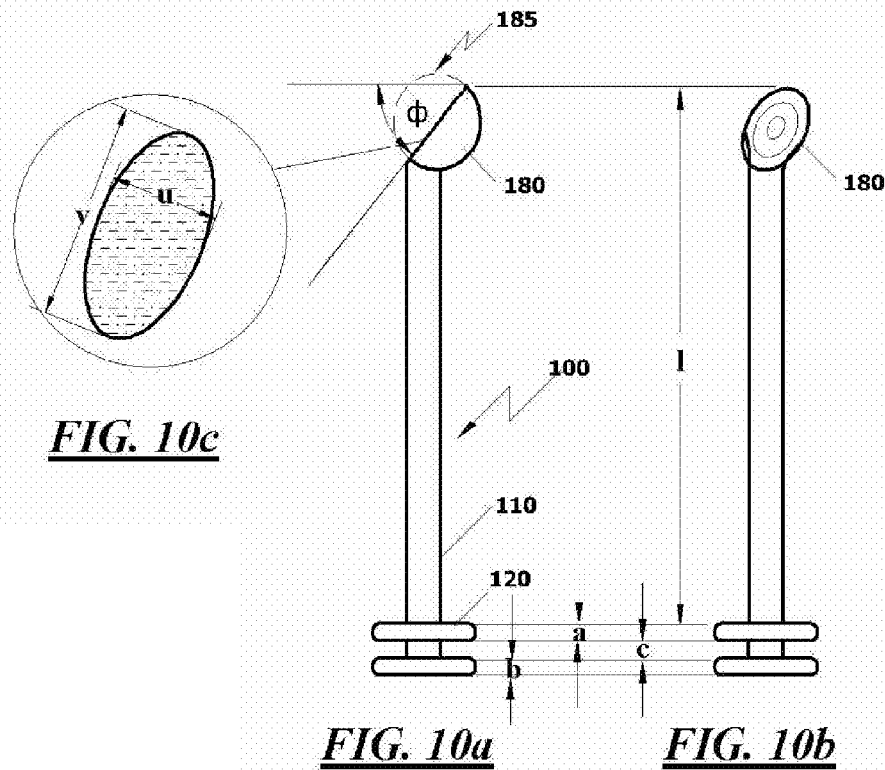
FIG. 9c   FIG. 9a   FIG. 9b
FIG. 10c
FIG. 10a   FIG. 10b

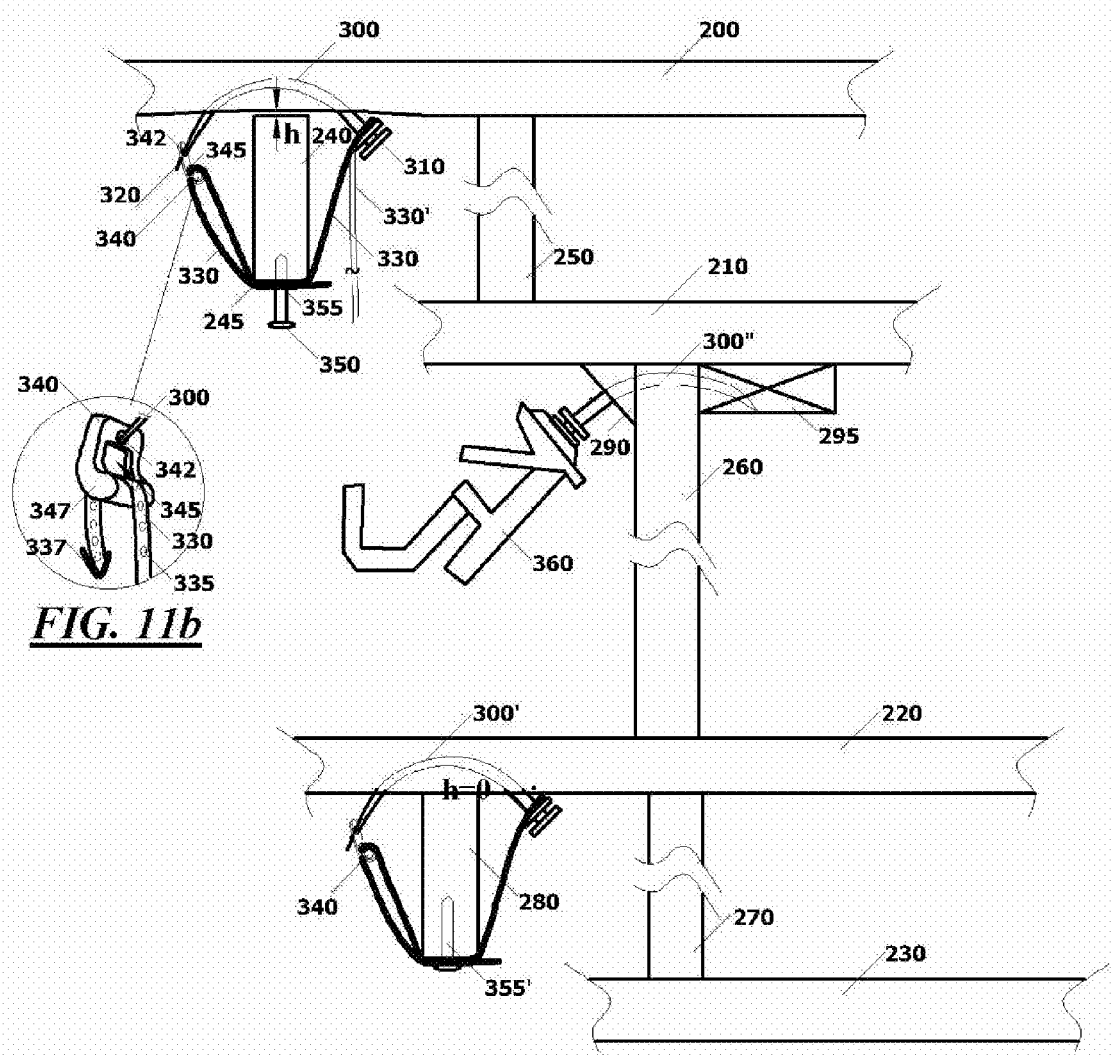

DIRECTIONAL FASTENER

This application claims priority under 35 U.S.C. 119(e) of U.S. provisional application Ser. No. 61/137,184 filed 28 Jul. 2008, the contents of which are incorporated herein by reference.

BACKGROUND

All references cited in this specification, and their references, are incorporated by reference herein where appropriate for teachings of additional or alternative details, features, and/or technical background.

Disclosed is a fastener which is configured to travel in any desired direction in a solid medium in which it is being propelled. The fastener may be propelled using a power-driven nailing machine, for example, or by hand, using a hammer.

Fasteners for fastening pieces of materials together are known in the art. It is common practice to drive a nail straight into two pieces of wood to hold them together as shown in FIG. 1, for example. Here, nail 10 is driven by hammer 20 thru two wooden members 30 and 40 so that the two members can be held together without separating from each other. However, there are many instances where it is inconvenient, and sometimes not possible to fasten pieces together simply by driving a straight nail through them as shown in FIG. 2. In FIG. 2, the same members 30 and 40 are to be fastened to each member. However, this time an intervening wall 50 obstructs the use of hammer 20' or hammer 20''. One may use a power-actuated tool such as a nailing machine 60 to drive nail 10'' at an angle, as shown in the same FIG. 2. (Nailing machines are well-known in the art and are not described in detail here in order not to unnecessarily obscure the present disclosure.) Still, nail 10'' barely misses member 40. Similarly, member 70 in FIG. 3 is to be fastened to member 40, but nail 10''' misses it. What is needed is a fastener which can be self-directed to change form and direction at the same time in order to conform to a desired fastening trajectory.

REFERENCES

U.S. Pat. No. 7,118,315 discloses a spike nail for nailing in walls made of gypsum boards or fiber boards. The spike has a nail body which consists of a first blade and a second blade. The nail body includes a striking section, an upper guiding sleeve, a lower guiding sleeve, a screw thread guiding section and a nail point section. The spike nail thus constructed can be nailed into gypsum board or fiber board walls to facilitate hanging articles.

U.S. Pat. No. 7,040,851 discloses a nail-shaped fastening element including a first, conical section tapering in a setting direction of the fastening element and having a shaped surface profile extending at least along a portion of the first section, and a second section adjoining the first section at end of the first section remote from the fastening element tip.

Another U.S. Pat. No. 5,658,109 discloses a steel pin and method for its manufacture. The steel pin is of a type to be forcibly driven into a steel substrate via a power-actuated tool. The steel pin has a substantially cylindrical shank and a substantially sharp point, which extends from one end of the substantially cylindrical shank, which conforms substantially to a tangent or secant ogive except for a substantially spherical tip having a radius in a range of about 0.015 inch (about 3.75 millimeters) to about 0.03 inch (about 7.5 millimeters), which has substantially true concentricity, which has surface-texture irregularities with a roughness-height index value not greater than about 30 microinches (about 0.76 micrometers). The ogive is a tangent ogive with an ogive radius about ten times the shank diameter and with an ogive length about twice the shank diameter, and the tip radius is about 0.1 times the shank diameter. The substantially cylindrical shank is joined to the substantially sharp point at a transition having a substantially smooth, continuously curved surface, and is knurled near the transition. The steel pin is made by deforming a length of steel wire, as by forging or swaging, so as to form the steel pin with the substantially cylindrical shank and with the substantially sharp point and reshaping the substantially pointed end, as by barrel finishing.

SUMMARY

Aspects disclosed herein include
an initially linearly straight directional fastener capable of changing form and direction simultaneously during operation in order to conform to a desired fastening trajectory while being propelled by a manual or a power-actuated tool; the linearly straight directional fastener further comprising a shank having two ends, one end having a head and the opposing end having one or more slanted surfaces forming a tip peripherally to the shank, wherein at least one slanted surface is of unequal length with respect to remaining slanted surfaces, the slanted surfaces having at least oblong shapes amongst others configured to exert forces on the tip peripheral to the shank to cause a non-linear change in the form and shape of the initially linearly straight directional fastener to further cause a continuous non-linear trajectory to the directional fastener in order to be able to fasten a member to at least one other member not in straight line-of-sight; wherein the aspect ratio (s/I) of the length (s) of the slanted surface to the length (I) of the shank range at least from about 0.0320 to about 0.0781; and a fluted channel formed starting from the slanted surfaces and continuing to the head on the opposing end of the shank in order to provide egress for material sliced or shaved while the directional fastener alters shape and direction simultaneously while traveling in the media into which it is being propelled.

an initially linearly straight directional fastener capable of changing form and direction simultaneously during operation in order to conform to a continuously changing non-linear trajectory while being propelled into two or more fastenable media by a manual or a power-actuated tool; the linearly straight directional fastener further comprising a shank having a top end and a bottom end; the bottom end having a head and the top end having a compound topology comprising at least circular and elliptical portions configured to force change of shape and a continuously changing non-linear trajectory to the initially linear directional fastener in order to be able to fasten a member to at least one other member not in line-of-sight; a fluted channel formed starting from the slanted surface and continuing to the head on the opposing end of the shank in order to provide egress for material sliced or shaved while the directional fastener travels in the media into which it is being propelled and wherein the ratio of the slant surface to the length of the shank ranges from about 0.09 to about 0.03, and values of the angle subtended by the slanted surfaces range from about 0° to about 55°.

a device comprising a directional fastener capable of changing form and direction simultaneously while being propelled in a medium by a manual or power-actuated tool; the directional fastener further comprising a shank having a top end and a bottom end; the bottom end having a head and the top end having a slanted surface; the slanted surface having a bulbous portion inclined at an angle from the horizontal; and a fluted channel formed starting from the slanted surface and continuing to the head on the opposing end of the shank.

BRIEF DESCRIPTION OF DRAWINGS

FIG. 1 shows the nailing of two members by using a hammer, according to prior art.

FIG. 2 shows the nailing of one member to another member at an angle using a power-tool when straight nailing is obstructed by an intervening member, according to prior art.

FIG. 3 shows the nailing of one member to one or more other members at an angle when straight nailing is obstructed by intervening members, according to prior art.

FIGS. 7a-7g show an embodiment of a presently disclosed directional fastener comprising a shank having two ends, one end having a head and the opposing end having a tip comprising a single slanted surface, the slanted surface having an oblong shape.

FIGS. 9a-9c show an embodiment of a presently disclosed device comprising a cylindrical shank having two ends, one end having a head and the opposing end having a slanted surface, the slanted surface having a compound topology further comprising circular and elliptical portions.

FIGS. 10a-10c show an embodiment of a presently disclosed device comprising a cylindrical shank having two ends, one end having a head and the opposing end having a slanted surface, the slanted surface having a bulbous portion inclined at an angle from the horizontal.

FIGS. 11a-11b show the use of the presently disclosed directional fastener in repairing squeaky floors.

DETAILED DESCRIPTION

In embodiments there is illustrated:

a directional fastener capable of changing form and direction simultaneously while being propelled in a medium by a manual or a power-actuated tool.

Figure 4:
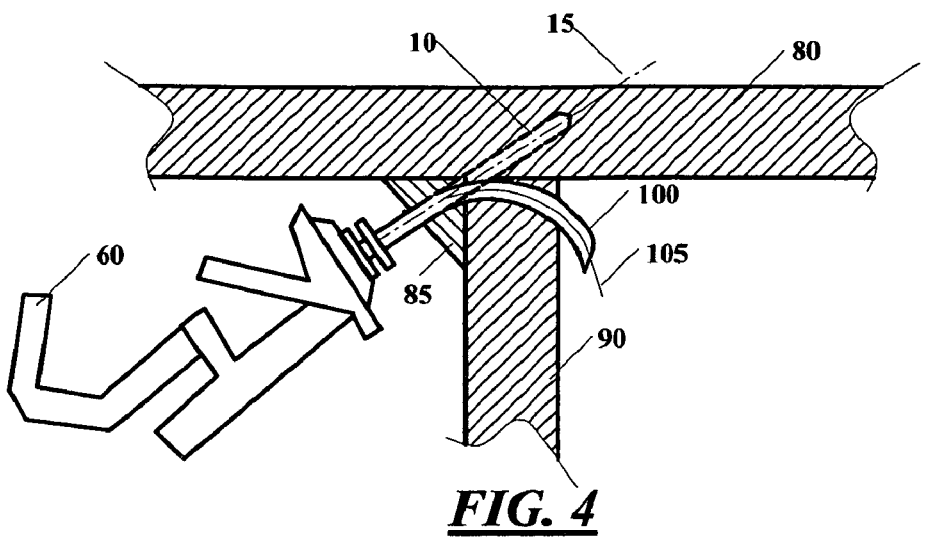
FIG. 4 shows an embodiment of fastening members in a non-linear trajectory using the presently disclosed directional fastener.
Figure 5:
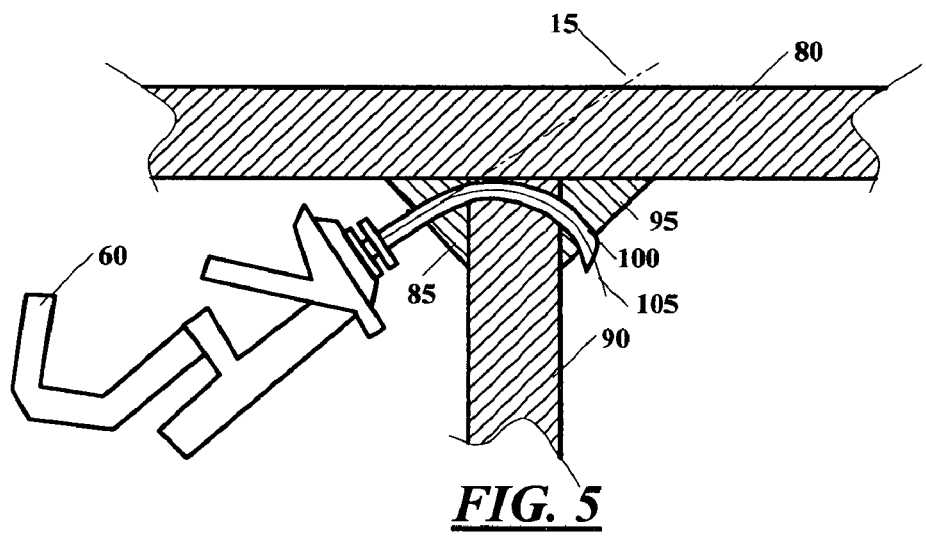
FIG. 5 shows an embodiment of fastening at least two or more members in a non-linear trajectory using the presently disclosed directional fastener.
Figure 6:
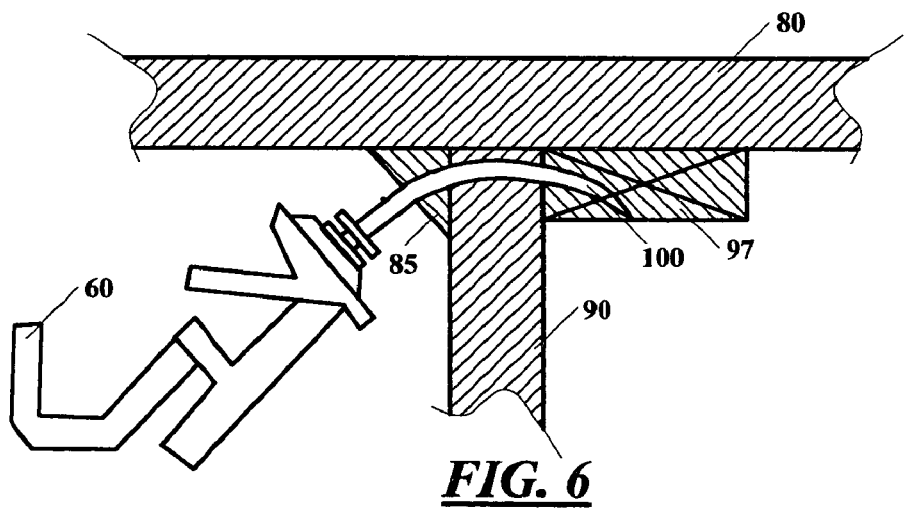
FIG. 6 shows an embodiment of fastening a plurality of members of differing shapes and sizes in a non-linear trajectory using the presently disclosed directional fastener.

Referring now to the drawings, FIGS. 4-6 show a directional fastener 100 being driven into several members to be fastened together. FIGS. 4-6 show cross-sectional views of members 80, 85, 90, 95 and 97 so that the directional fastener 100 may be distinguished more readily. As shown in FIG. 4, the disclosed directional fastener 100 is capable of fastening a member 85 to another member 90 where member 90 is already fastened (not shown) to member 80. In contrast, a conventional fastener 10, which when driven by the same tool 60 is propelled in a linear direction 15, thus missing member 90 to which it is desired to be fastened. The disclosed fastener 100 is able to contort and change direction along non-linear axis 105 so as to be able to advance from member 85 towards member 90. FIGS. 5 and 6 show how a directional fastener 100 may be used to fasten members such as 95 and 97 which are behind member 90 and not necessarily reachable conveniently. It will be appreciated by those skilled in the art that there are other circumstances too many to recite here in which it would be desirable to direct a fastener in a non-linear trajectory in order to be able to fasten a member which otherwise is not in line-of-sight.

In another embodiment shown in FIG. 7a, directional fastener 100 comprising a shank 110 is formed with a fluted channel 115 starting from slanted surface 135 and continuing to head 120 on the opposing end of the shank. The fluted channel 115 provides egress for material sliced or shaved while the directional fastener travels in the medium in which it is being propelled. It is preferred that the depth of channel 115 is between about one-third to one-half the diameter d of shank 110.

In an embodiment illustrated in FIG. 7a, fastener 100 has a length l, substantially cylindrical shank 110 having a given diameter d, a head 120 having a larger diameter d' and formed at one end of the shank and a slanted surface 130 extending from the other end of the shank 110 and ending with a relatively sharp edge 135 as better seen in an enlarged view 130' of the slanted edge 130 in FIG. 7b. The slanted surface 130 is formed by cutting the end of shank 110 at an angle β. FIG. 7c shows an oblong view 130" of the slanted face 130 when observed directly.

In one aspect of the disclosed fastener with a preferred length l between about 4 inches and 12 inches and a diameter d between about 5/32 inches and 10/32 inches, the preferred angle β ranges between about 30 degrees and 55 degrees. The head 120 of fastener 110 may be single or double-headed as shown in FIG. 7a to accommodate the jaw of the power-actuated tool used to drive the fastener. For commonly used power-tools such as 60 shown in FIG. 6, the preferred dimensions are as follows: d' between about 10/32 inches and 17/32 inches; a between about 2/32 inches and b4/32 inches, and c between about 2/32 inches and 4/32 inches. It will be understood that these dimensions may vary depending upon the application. However, it is preferred that the following aspect ratios of (s/l) or values of β be used to provide the desired trajectories in the directions shown in the table below when driving fasteners of differing lengths:

TABLE

Directional Fastners with single slanted surface s and length l

| Direction | l | β | s | (s/l) |
| --- | --- | --- | --- | --- |
| Straight (0°) | 4-12 in. | 0° | 0 | 0 |
| Right (90°) | 4" | 30° | 0.3125" | 0.0781 |
| Left (270°) | 4" | 55° | 0.1875" | 0.0475 |
| ... | | | | |
| Right (90°) | 12" | 30° | 0.6250" | 0.0520 |
| Left (270°) | 12" | 55° | 0.3750" | 0.0320 |

Figures 7E, 7F, 7G:
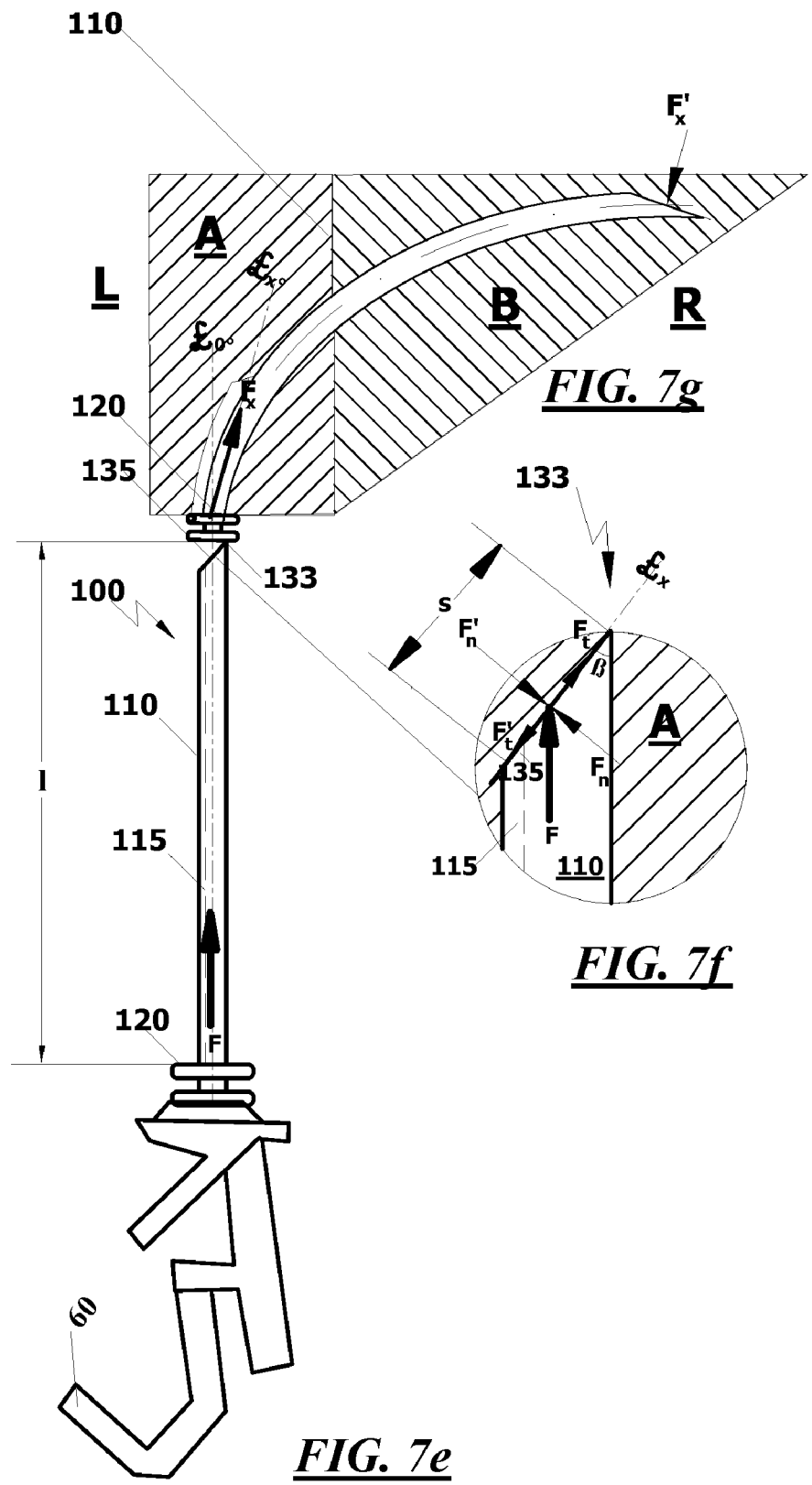

In an aspect of the operation of the disclosed device, a directional fastener 100 comprising a shank 110 having an impact head 120 at one end, and prephireally formed a single slanted surface 135 forming a tip 133 at the other end is loaded in a nail-gun 60 as shown FIG. 7e. As an illustrative example, two blocks of wood A and B, not in line-of-sight of each other and which cannot be accessed either from the right side R or from the left side L (shown in FIG. 7g) are to be nailed or fastened together. For the purposes of this illustration, only the bottom side of block A is accessible where the tip 133 of directional fastener 100 is positioned with nail-gun 60 as shown in FIG. 7e. (It will be understood by those skilled in the art that FIG. 7e shows the position of the directional fastener 100 before being propelled while the cross-sectional view of FIG. 7g shows the shank 110 of the directional fastener 100 embedded into blocks A and B with the head 120 being stopped flush with the bottom of block A. In other words, FIGS. 7e and FIG. 7g are two different snapshots of the same directional fastener 100 before and after, respectively, the operation of fastening the media- e.g., wood- A and B together) FIG. 7f shows an exploded view of tip 133 as it is being driven into block A buy gun 60. Tip 133 has a single slanted surface 135 with a length of s and included angle β as shown in FIG. 7f. When directional fastener 100 is being driven with impact force $F_x$ (which resolve into normal and tangential forces $F_n$ and $F_t$, respectively, as shown in the same FIG. 7f) the media develop opposite reactive forces $F'_n$ and $F'_t$ with resultant force $F'_x$ on slanted surface 135 as shown schematically in FIGS. 7e-7g. Forces $F'_n$ and $F'_t$ cause a continuous change in the direction of travel of tip 133, while the resultant force $F'_x$ acting on the body shank 110 causes a simulataneous nonlinear change in the initially linear shape and form of the directional fasterener 100. It will be noted that in the absence of a slanted surface, i.e., when it is flat with angle β=180° then the directional fastener 100 would travel straight ahead with no changes in the shape or direction of the fastener, except for bent or other distorted shape due to substantial forces that would be developed on the flat surface (in the other limiting case where β=0°, there would be no tip 135, hence a singularity of an indeterminate fastener.

Figures 8A, 8B, 8C, 8D:
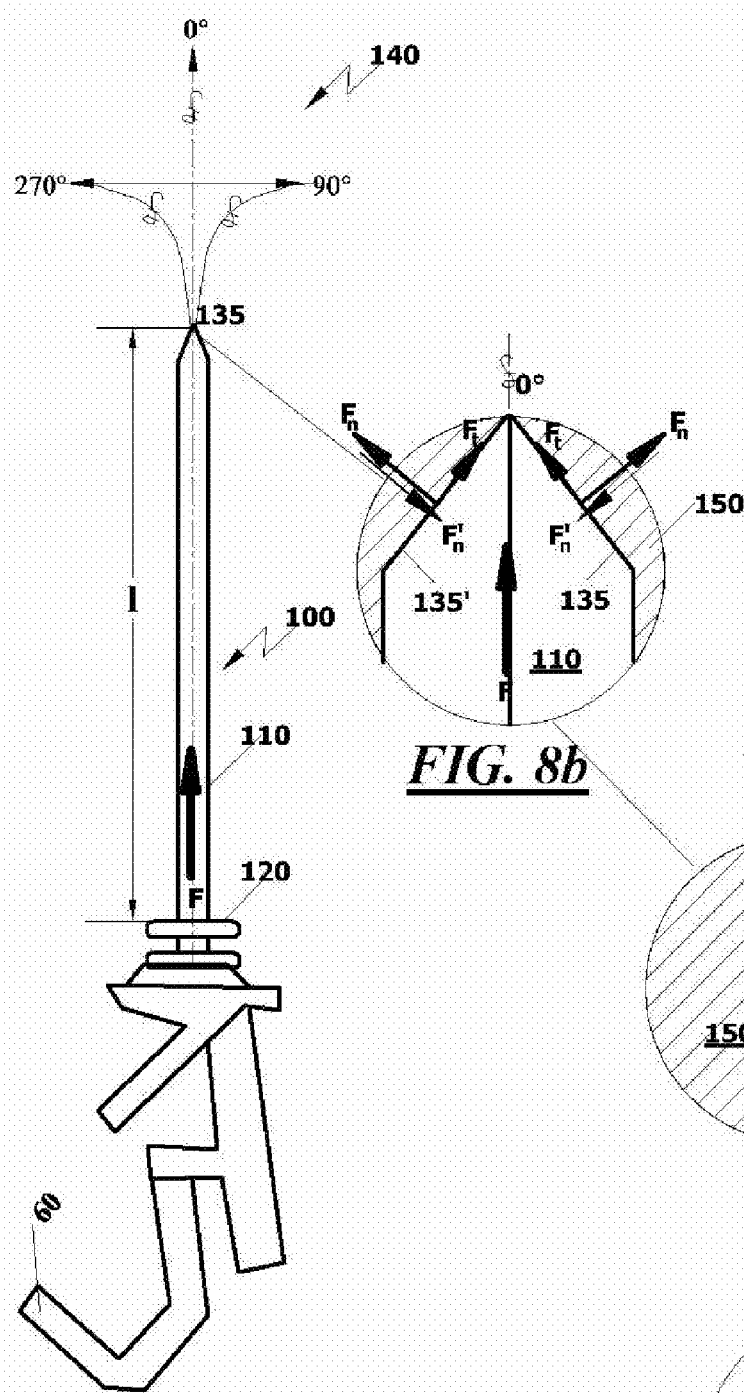
FIGS. 8a-8g show an embodiment of a presently disclosed device comprising a cylindrical shank having two ends, one end having a head and the opposing end having a tip comprising one or more slanted surfaces spaced around the periphery of the shank.

In FIGS. 7a and 7c, the fluted channel 115 has a depth in between about 3/32 inches to 5/32 inches with a width between about 1/32 to 2/32 inches. FIG. 8a shows fastener 100 with a dual-faced symmetrical tip 135. When driven by tool 60, the fastener travels straight in 0° direction shown in quadrants 140. This is because the propelling F force is resolved into normal and tangential components, $F_n$ and $F_t$ along surfaces 135 and 135', respectively, which act on medium 150 in which it is traveling. In reaction, medium 150 acts equally on surfaces 135 and 135' as shown by forces $F_n'$ and $F_t'$.

On the other hand, in the embodiment illustrated in FIG. 8c, face 135' is missing, and hence the reactive force $F_n'$ guides fastener 100 in direction $\mathfrak{x}_m$ rather than the $\mathfrak{x}_{0°}$ direction.

In still another embodiment shown in FIG. 8d, shank 110 may be modified to have a partially formed second slanted surface 139, in order to guide fastener 100 in still another desired direction $\mathfrak{x}_n$.

In another aspect, a multiplicity of slanted surfaces, such as 130' shown in FIG. 8b may be formed around the periphery of shank 110. It will be understood by those skilled in the art that when the length s of at least one of the slanted surfaces is unequal to that of the remaining ones, then the directional fastener 100 will be urged to follow yet another non-linear path $\mathfrak{x}_x$ depending upon the resultant force $F_x$ acting on the slanted surfaces as shown in FIGS. 8e-8g.

Figures 8E, 8F, 8G:
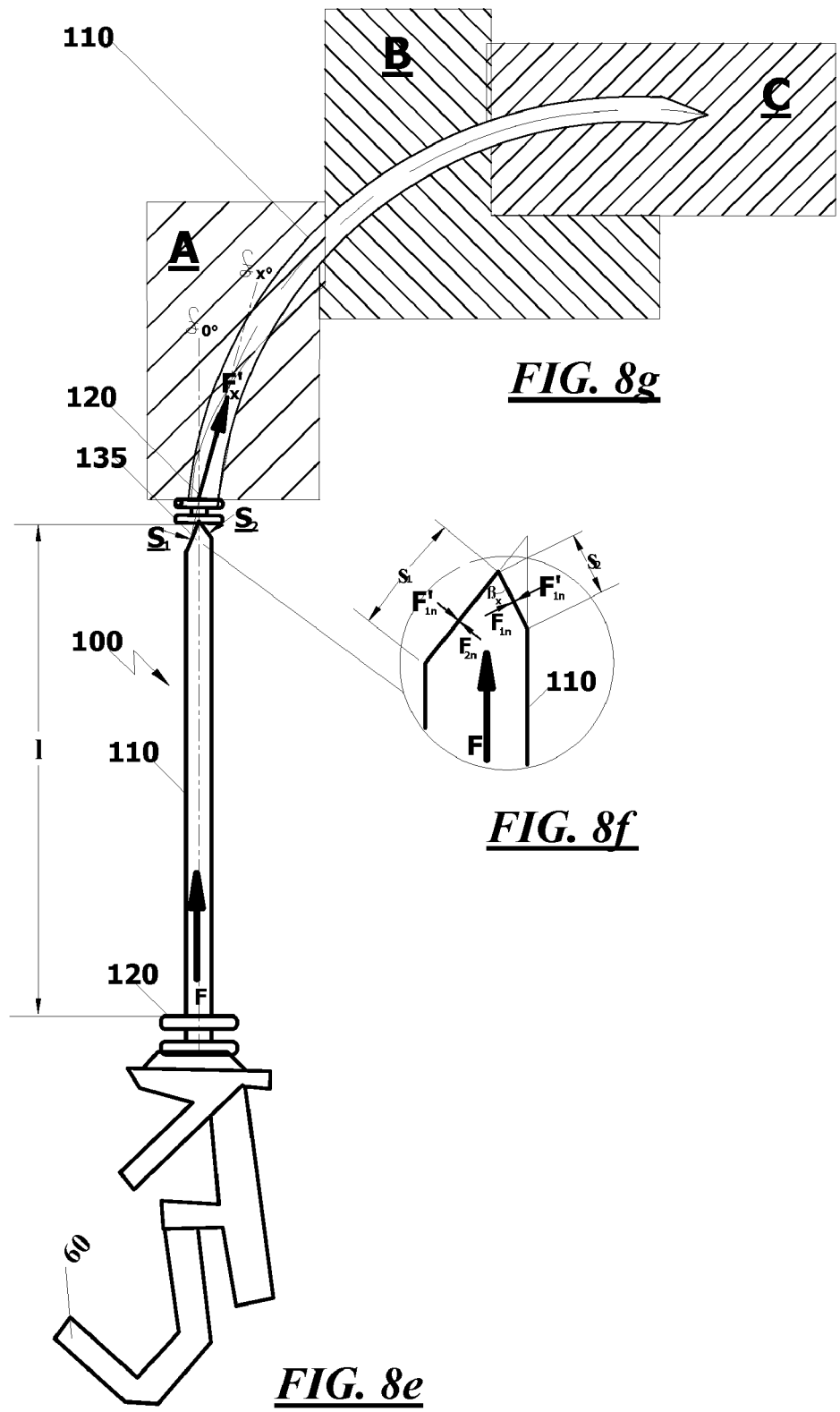

In a more specific aspect of the disclosed device, FIG. 8e shows the automatic nail gun 60 of FIG. 8a loaded with directional fastener 100 comprising a shank 110 having an impact head 120 at one end, and prephireally formed slanted surfaces $S_1$ and $S_2$ forming a tip 133. Surface $S_1$ has a length of $s_1$ and surface $S_2$ has a length of $s_2$, wherein for illustrative purposes, $s_1 > s_2$ forming the tip 133 having a subtended angle $\beta_x$ as shown in FIG. 8f. Hence, when propelled by gun 60, the driving impact force F imparted by the gun 60 on the totality of the directional fastener 100 via the impact head 120 of shank 110 resolves into normal forces $F_{1n}$ and $F_{2n}$ acting on surfaces $S_1$, $S_2$, respectively, of tip 133. Then, media A, B and C, in turn, react to exert equal and opposite forces $F'_{1n}$ and $F'_{2n}$, respectively, on the slanted surfaces $s_1$ and $s_2$, causing a continuous nonlinear change in the direction of travel of tip 133, while the resultant force $F'_x$ acting on the body shank 110 causing simultaneously a nonlinear change in the initially linear shape and form of the directional fasterener 100. It will be noted that when the slanted surfaces are substantially of equal length, hence of equal area, such as shown in FIG. 8b, then both slanted surfaces $s_1$ and $s_2$ will be subjected to equivalent forces guiding the directional fastener in the direction of the impact force delivered by gun 60 without any change in direction or form which in the case showin in FIG. 8e, causing the fastener to travel straight into block A, missing blocks B and C shown in FIG. 8g.

FIG. 9a shows fastener 100 formed to assume a compound surface comprising a circular portion 160 on the right side and elliptical portion 170 on the left side as shown in the respective side views FIGS. 9b and FIG. 9c. As shown in FIG. 9a, circular portion 160 is cut at an angle α from the horizontal between about 30 degrees and 55 degrees at opposite end to the bottom end 120 yielding a radius r between about 5/64 inches and 10/64 inches. The elliptical portion 170 is swept at an angle γ between about 30 degrees and 45 degrees with a radius R between about 2 1/16 inches and 7 inches emanating from origin O located at l' distance between about 3 26/32 inches and 11 26/32 inches from head 120 yielding an ellipse with a minor radius r' between about 5/64 inches and 10/64 inches and a major radius r" between about 5/8 inches and 1 7/8 inches. The center O' of circular portion 160 is l' distance between about 3 14/16 inches and 11 11/16 inches from the same head 120. It is preferred that the elliptical portion 170 is displaced from tip 160 by e distance between about 6/32 inches and 12/32 inches in order to provide a relatively strong tip 160. It will be noted that distance e may be varied by adjusting distance l', which determines the origin O of radius R, as shown in FIGS. 9a-9c Distance f in FIG. 9a represents the major radius r" of the elliptical portion 170 from the side view, and hence ranges from about 5/8 inches to about 1 7/8 inches.

FIGS. 10a-10c show yet another embodiment of a directional fastener 100 having a bulbous spoon shaped tip 180 inclined at an angle φ from the horizontal. The bulbous portion 180 is formed first by forming approximately a solid spherical bulb 185 having a diameter between about ½ inch to ¾ inches, and then slicing it at an angle φ between about 30 and 55 degrees to remove substantially half of the spheroidal bulb 185. The resulting semi-ellipsoidal bulbous portion 180 forms a flat elliptical surface having a major axis v and a minor axis u ranging from about ½ inch to about 1 inch, and from about ¼ inch to ½ inches, respectively.

Though these numerous shapes and details of the disclosed directional fastener have been set forth here to provide an understanding of the present disclosure, it will be known, however, to those skilled in the art that these specific details need not be employed to practice the present invention. At the same time, it will be evident that the same details may be employed in other similar configurations of the directional fastener that are too many to cite, such as shanks of different diameters, and tips and heads of different shapes and sizes.

In operation, directional fasteners may be used advantageously in many different construction schemes. FIGS. 11a-11b illustrate how floors, for example, can be fixed when they become squeaky after many years of installation. Of the multiplicity of floors 200, 210, 220 and 230 shown in FIG. 11a, a gap h has developed between floor 200 and one of joists 240 that support the floor, thus causing unwanted squeaking noises as the floor flexed while walking on it, for example. Other joists for the shown floors are referenced by numerals 250, 260 and 270 for illustrative purposes. It is desirable to close gap h between floor 200 and joist 240 to eliminate the noise. A directional fastener 300 is first threaded through one of a multiplicity of openings 335 at one end of a metal strap 330, and the metal strip 330 is slid against the head 310 of the fastener 300, as shown in FIG. 11a. Then, while the other end of the metal strap is left hanging freely as shown in phantom 330', directional fastener 300 is driven (by a power-actuated tool, for example, not shown) into underside of floor 200 in such a manner that the fastener deforms and changes direction and its tip 320 emerges from the underside of floor 200 on the other side of joist 240. Tip 320 is inserted into opening 342 in an offset device 340, better seen in FIG. 11b. While device 340 is engaged onto tip 320, the free end 337 of strap 330 is next inserted through another opening 345 in device 340 and pulled towards the bottom end of joist 240 and tightened by leveraging the strap against bottom corner 245 of joist 240. The offset handle portion 347 of device 340 can be manipulated judiciously so as to be able to pull the strap 330 until the top portion of joist 240 contacts the bottom of floor 200, thusly eliminating gap h. While tightly leveraging strap 330 against corner 245, another fastener, such as an ordinary nail 350, can be inserted into matching holes 355 in metal strap 330 and secured into joist 240.

Another representative squeaky floor that has been fixed with a directional fastener 300' in the same manner is illustratively shown below floor 220 in Figure ha where gap h=0, that is, where the gap is reduced to zero, hence eliminated. Another directional fastener 300" is used to secure elements 290 and 295 to joist 260 under floor 210. A power-tool 360 is used for driving the directional fastener into elements 290 and 295.

In an aspect of the embodiments, the material used for directional fasteners comprises metals such as steel and aluminum, including bimetallic shanks so that the fastener may contort in the direction it is directed to travel. Plastics, or hardened plastic fasteners may also be used depending upon the materials that are contemplated for being fastened to each other.

While the invention has been particularly shown and described with reference to a particular embodiment(s), it will be appreciated that variations of the above-disclosed embodiments(s) and other features and function, or alternatives thereof, may be desirably combined into many other different systems or applications Also that various presently unforeseen and unanticipated alternatives, modifications, variations or improvements therein may be subsequently made by those skilled in the art which are also intended to be encompassed by the following claims.

What is claimed is:

1. A device comprising
an initially linearly straight directional fastener capable of changing form and direction simultaneously during operation in order to conform to a desired fastening trajectory while being propelled by a manual or a power-actuated tool;
the linearly straight directional fastener further comprising a shank having two ends, one end having a head and the opposing end having one or more slanted surfaces forming a tip peripherally to the shank, wherein at least one slanted surface is of unequal length with respect to remaining slanted surfaces, the slanted surfaces having at least oblong shapes amongst others configured to exert forces on the tip peripheral to the shank to cause a non-linear change in the form and shape of the initially linearly straight directional fastener to further cause a continuous non-linear trajectory to the directional fastener in order to be able to fasten a member to at least one other member not in straight line-of-sight;
wherein the aspect ratio (s/I) of the length (s) of at least a single slanted surface to the length (I) of the shank range at least from about 0.0320 to about 0.0781; and
a fluted channel formed starting from the slanted surfaces and continuing to the head on the opposing end of the shank in order to provide egress for material sliced or shaved while the directional fastener alters shape and direction simultaneously while traveling in the media into which it is being propelled.

2. The device according to claim 1, wherein the shank has a length ranging from about 4 inches to about 12 inches.

3. The device according to claim 1, wherein the shank has a diameter ranging from about 5/32 inches to about 5/16 inches.

4. The device according to claim 1, wherein at least one slanted surface has a length ranging from about 0.1875 inches to about 0.6250 inches.

5. The device according to claim 1, wherein the fluted channel has a depth ranging from about 3/32 inches to about 5/32 inches.

6. The device according to claim 1, wherein the fluted channel has a width ranging from about 1/32 inches to about 1/16 inches.

7. The device according to claim 1, wherein the shank material comprises aluminum.

8. The device according to claim 1, wherein the shank comprises a bi-metallic material.

9. A device comprising
an initially linearly straight directional fastener capable of changing form and direction simultaneously during operation in order to conform to a continuously changing non-linear trajectory while being propelled into two or more fastenable media by a manual or a power-actuated tool;
the linearly straight directional fastener further comprising a shank having a top end and a bottom end;
the bottom end having a head and the top end having a compound topology comprising at least circular and elliptical portions configured to force change of shape and a continuously changing non-linear trajectory to the initially linear directional fastener in order to be able to fasten a member to at least one other member not in line-of-sight; and
a fluted channel formed starting from the slanted surface and continuing to the head on the opposing end of the shank in order to provide egress for material sliced or shaved while the directional fastener travels in the media into which it is being propelled.

10. The device according to claim 9, wherein the circular portion is cut at an angle ranging from about 30 degrees to about 55 degrees.

11. The device according to claim 9, wherein the elliptical portion subtends an angle ranging from about 30 degrees to about 45 degrees.

12. The device according to claim 9, wherein the elliptical portion has a major radius ranging from about 5/8 inches to about 1-7/8 inches.

13. The device according to claim 1, wherein the ratio of the slant surface to the length of the shank ranges from about 0.09 to about 0.03, and values of angle beta ranges from about 0° to about 55°.

* * * * *